(12) United States Patent
Ueno et al.

(10) Patent No.: US 6,854,918 B2
(45) Date of Patent: Feb. 15, 2005

(54) BONDING STRUCTURE HAVING PROTRUSIONS

(75) Inventors: Masato Ueno, Anjo (JP); Yoshifumi Watanabe, Kariya (JP)

(73) Assignee: Denso Corporation, Kariya (JP)

( * ) Notice: Subject to any disclaimer, the term of this patent is extended or adjusted under 35 U.S.C. 154(b) by 45 days.

(21) Appl. No.: 10/630,841

(22) Filed: Jul. 31, 2003

(65) Prior Publication Data

US 2004/0028894 A1 Feb. 12, 2004

(30) Foreign Application Priority Data

Aug. 7, 2002 (JP) ........................................ 2002-230356

(51) Int. Cl.$^7$ .............................................. G01L 19/14
(52) U.S. Cl. ...................................... 403/265; 403/267
(58) Field of Search ................................ 406/265, 266, 406/267, 268

(56) References Cited

U.S. PATENT DOCUMENTS 4,554,196 A * 11/1985 Meeker .................. 403/267 X
4,643,040 A * 2/1987 Adam et al. ............. 403/267 X
6,059,483 A * 5/2000 Owens et al. ............... 403/267

FOREIGN PATENT DOCUMENTS

| JP | A-8-152374 | 6/1996 |
| JP | A-10-318869 | 12/1998 |

* cited by examiner

Primary Examiner—John R. Cottingham
(74) Attorney, Agent, or Firm—Posz & Bethards, PLC

(57) ABSTRACT

A first body is bonded with a second body to accommodate a sensor element therein. An annular convexity is formed at either the first body or the second body along with its peripheral end border. On the other of the first body and the second body, an annular concavity is formed to engage with the convexity. The convexity engages with the concavity to form an inner gap and an outer gap. Glue is filled in the inner gap and the outer gap. The peripheral surface of the convexity and the peripheral surface of the concavity, where the glue is bonded, have plural protrusions.

9 Claims, 4 Drawing Sheets

BONDING STRUCTURE HAVING PROTRUSIONS

CROSS REFERENCE TO RELATED APPLICATION

This application relates to and incorporates herein by reference Japanese Patent Application No. 2002-230356 filed on Aug. 7, 2002.

FIELD OF THE INVENTION

The present invention relates to a bonding structure to bond air-tightly a first body and a second body, which accommodate a sensor element.

BACKGROUND OF THE INVENTION

In a conventional bonding structures described in JP-A-8-152374, a bonding structure using glue between an annular concavity formed on a first body and an annular convexity formed on a second body is applied to a pressure sensor. The pressure sensor accommodates a sensor element in the first body. The sensor element is connected with a lead frame by gold wires or the like to transmit signals to outer devices such as ECU. A material used for the first body has to be heat-resistant so that the first body is durable for wire-bonding works. The first body is made of polyphenylene sulfide (hereinafter referred to simply as "PPS") or the like. The second body is made of polybutylene terephthalate (hereinafter referred to simply as "PBT") or the like. The concavity formed at the first body and the convexity formed on the second body are bonded with epoxy resin glue.

However, when the bonded first body and the second body are utilized under actual utilizing temperature condition, a peeling arises at the bonding structure due to difference of each coefficient of linier expansion of resin materials used for the first body, the glue, and the second body. Thus, a leak path is formed at the bonding structure. Pressure around the sensor element leaks, and becomes unstable. Thus reliability of the pressure sensor decreases.

SUMMARY OF THE INVENTION

In view of the foregoing problems, it is an object of the present invention to provide a bonding structure to enhance reliability of the sensor.

In the present invention, an annular concavity is formed at one of a first body and a second body along with its periphery. On the other of the first body or the second body, an annular convexity is formed peripherally to engage with the concavity. The width of the concavity is designed to be wider than the width of the convexity. When the convexity engages with the concavity, appropriate gaps are formed between the convexity and the concavity. That is, annular gaps are formed on the both peripheral sides of the convexity. One of the gaps defined between the inner peripheral surface of the convexity and the opposing surface of the concavity is referred to as "inner-gap" hereinafter. The other gap defined between the outer peripheral surface of the convexity and the opposing surface of the concavity is referred to as "outer-gap" hereinafter. Glue is filled at least one of the inner-gap or the outer-gap.

At least one peripheral surface of the concavity or the convexity, which forms the gap filled with glue, has designated protrusions. The formation of the protrusions widens adhesive area in which shearing bonding force works in addition to tensile bonding strength. Total bonding force is increased, and the surfaces between the first body and the second body can be bonded air-tightly. Thus, reliability of the sensor is enhanced.

Preferably, the protrusions are formed at either the inner-gap or the outer-gap. As far as either the inner-gap or the outer-gap is bonded by the glue strongly, a leak-path is not formed. If the protrusions are formed at both of the inner-gap and the outer-gap, and are bonded with the glue at the both gaps, thermal stress or the like cannot be relaxed. Thus, the protrusions are to be formed on the peripheral surface which forms either the inner-gap or the outer-gap.

Preferably, both of the peripheral surfaces inside of the inner-gap have the protrusions, and both of the peripheral surfaces inside of the outer-gap are formed to be flat.

Preferably, the protrusions are plural gathers protruded as streaks from the peripheral surface. Additional adhesive area is formed by side wall of the protruded streak. Thus, bonding strength in shearing direction between the glue and the adhesive surface is enhanced.

Preferably, the streaks are formed to be parallel to the direction in which the concavity engages with the convexity. When the gathers are molded integrally with the first body and the second body, the first body and the second body can be drawn out from an injection mold easily.

Preferably, the protrusions are formed in a same shape on all peripheral surfaces of the convexity and the concavity at same intervals. To maintain air-tight property, bonding strength has to be distributed uniformly. Nonuniformity of protrusions makes difference of adhesive strength, and causes stress concentration, and is apt to be a cause of a leakage.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
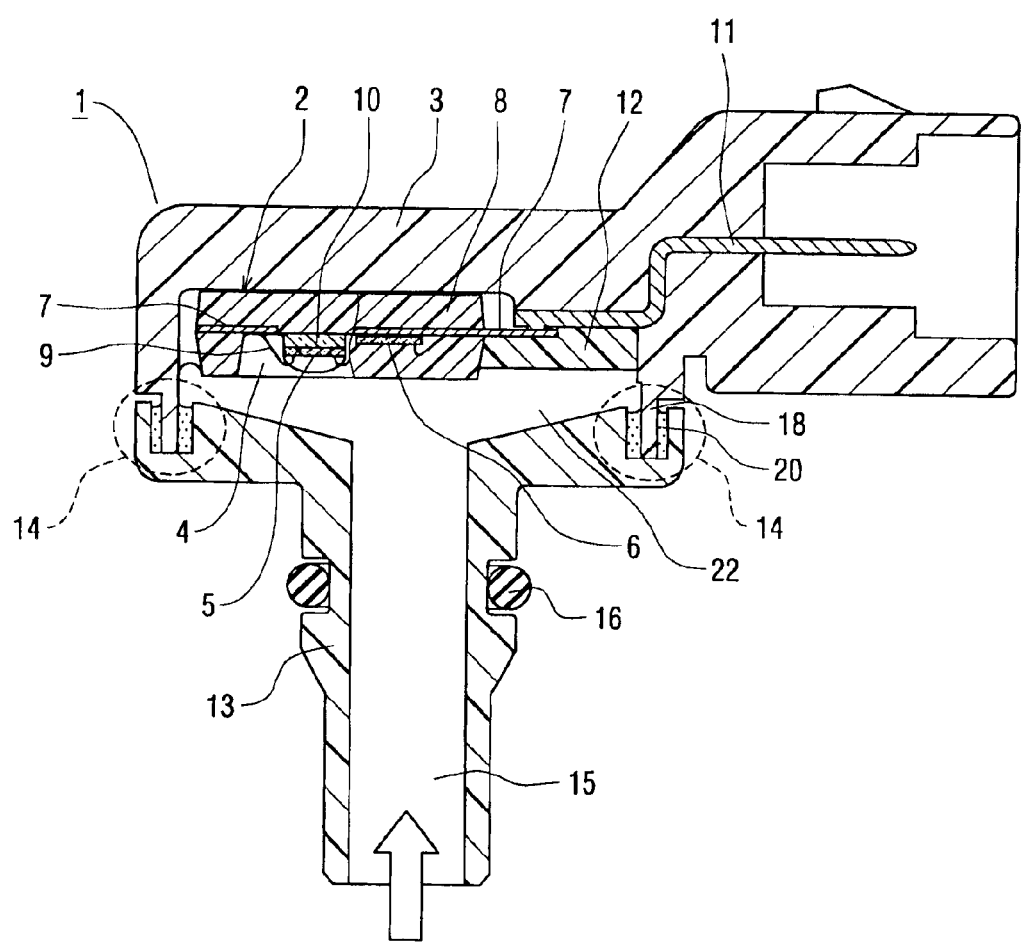
FIG. 1 is a cross-sectional view illustrating a pressure sensor according to an embodiment of the present invention.

Referring first to FIG. 1, a pressure sensor 1 accommodates a molded IC 2 in a first body 3 as a pressure detection element. A recessed holder 4 is formed on the molded IC 2. A sensor element 5 is accommodated in the holder 4 to detect pressure. The molded IC 2 encloses internal parts with a molding resin 8, which is made of an epoxy resin or the like, and protects its internal parts. The internal parts comprise a signal conditioning IC 6, which amplifies signals from the sensor element 5, and a lead frame 7 which transmit output signals of the IC 6.

The sensor element 5 is set so that the pressure detecting surface thereof faces toward the opening of the holder 4. The sensor element 5 and the lead frame 7 are connected electrically by wire bonding using wires 9 made of gold or the like. Plural diffused resistors are disposed on a diaphragm, which is made of single crystal silicon, of the sensor element 5. The diffused resistors are connected to form a bridge circuit. The sensor element 5 is bonded on a glass pedestal 10 by glass joining or the like. The glass pedestal 10 is bonded to the bottom face of the holder 4 with silicone resin or the like.

The first body 3 is made of a heat resisting resin material such as PPS to resist bonding work. The lead frame 7 is connected to connector pins 11 electrically. Connection points between the lead frame 7 and the connector pins 11 are sealed with a potting resin 12 or the like. Each connector pin 11 is to be connected to an outer processing circuit (not shown). The first body 3 has a convexity 18 on the bottom end thereof. The convexity 18 is formed along the peripheral border of the bottom end of the first body 3 annularly.

A second body 13, which is made of PBT or the like, has concavity 17 at the top end thereof. The concavity 17 is formed along the peripheral border of the top end of the second body 13 annularly. The concavity 17 of the second body 13 engages with the convexity 18 of the first body 3, and convexity 18 is inserted in the concavity 17. Glue 20 is filled in annular gaps (19A, 19B) between both peripheral surfaces of the convexity 18 and the both peripheral surfaces of the concavity 17. Thus, the second body 13 is bonded with the first body 3 air-tightly. The bonded annular engagement section forms an annular bonding section 14 shown by a dotted line.

A pressure inlet 15 is led to the pressure detecting surface of the sensor element 5 which is disposed in a chamber 22. The chamber 22 is surrounded by the air-tight annular bonding section 14 and is isolated from outside ambient air. An O-ring 16 is attached around the pressure inlet 15. The pressure sensor 1 can be attached at a designated place with the O-ring 16.

When pressure is applied in a direction indicated by an arrow shown in FIG. 1, the pressure is introduced to the pressure detecting surface of the sensor element 5 through the pressure inlet 15 of the second body 13. The diaphragm of the sensor element 5 deforms as pressure applies on the surface. The diffused resistor on the surface varies resistance thereof corresponding to deformation of the diaphragm. The resistance variation is picked up as a voltage signal from the bridge circuit. The voltage signal is amplified by the signal conditioning IC 6 and is transmitted to an outer signal processing circuit (not shown) via the lead frame 7 and the connector pins 11.

Figure 2A:
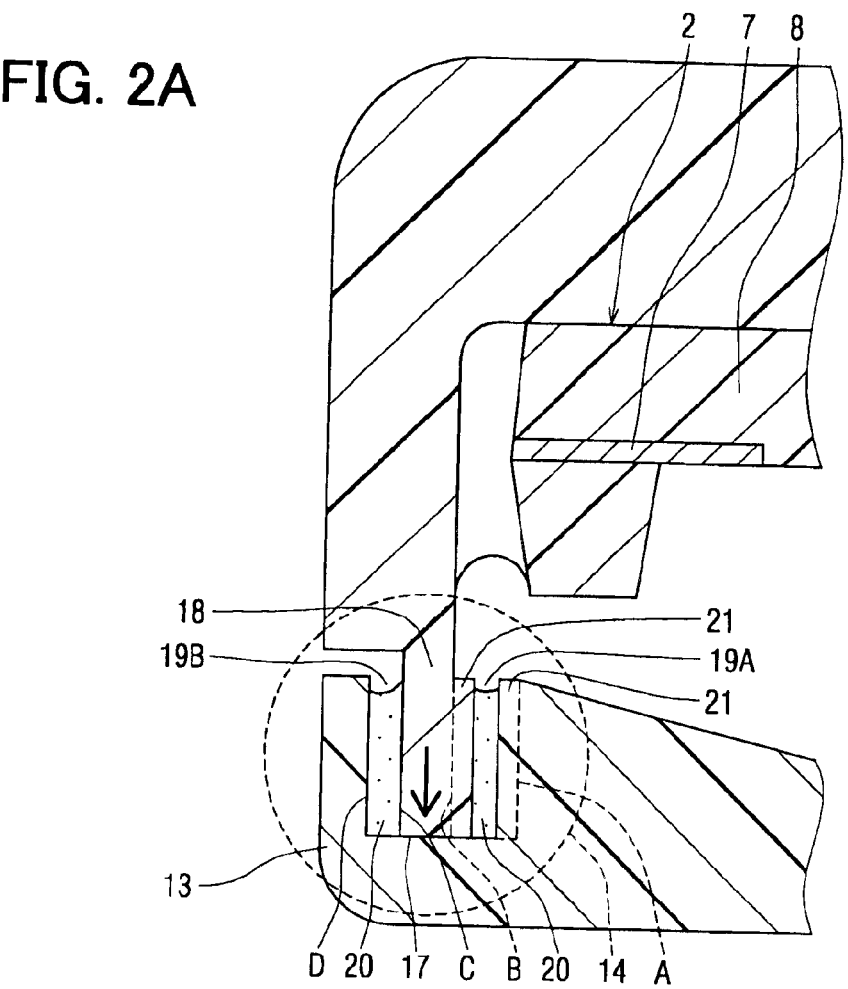
FIG. 2A is a cross-sectional view illustrating protrusions formed along the engagement direction.

In the bonding section 14 shown in the FIG. 2A, the annular concavity 17 is formed in the first body 3. The annular convexity 18 is formed on the second body 13 to engage with the annular concavity 17. In this bonding structure, relationship of the concavity 17 and the convexity 18 is upside down comparing with the bonding section 14 shown in FIG. 1. The bonding structure can be used at any angle. The annular convexity 18 engages with the annular concavity 17, and is inserted in the annular concavity 17 forming an annular engagement section. When the top end of the convexity 18 contacts the bottom surface of the concavity 17, designated annular gaps 19A and 19B are formed between both peripheral surfaces of the convexity 18 and both peripheral surfaces of the concavity 17. The annular gaps 19A and 19B are filled with glue 20, which is made of hard epoxy resin or the like. The glue 20 and the annular concavity 17 and the glue 20 and the annular convexity 18 are bonded at both inner peripheral surfaces thereof and outer peripheral surfaces thereof. Thus, the annular bonding section 14 is formed.

In the annular bonding section 14, plural protrusions 21 are formed on the peripheral surfaces of the annular gap 19A to widen bonding surface of the peripheral surfaces with the glue 20.

Figure 2B:
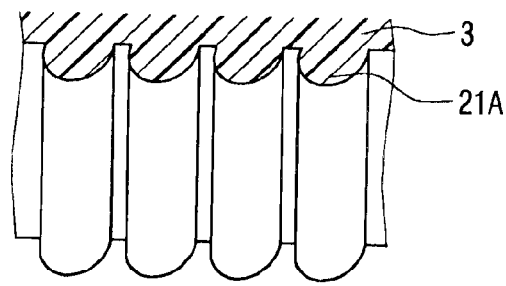
FIG. 2B is a perspective view illustrating wave-shaped gathers.
Figure 2C:
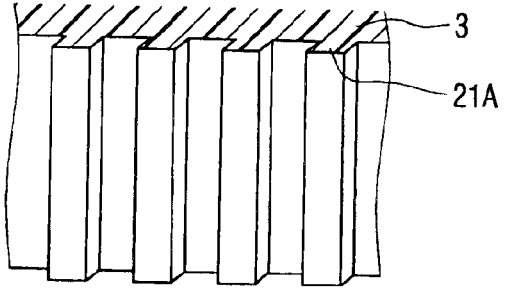
FIG. 2C is a perspective view illustrating rectangular-shaped gathers.

As shown in FIG. 2A, the protrusions 21 are formed on both A-surface of the concavity 17 and B-surface of the convexity 18 at the annular-gap 19A. The protrusions 21 are formed integrally with the first body 3 and the second body 13, and are formed in parallel with a direction in which the convexity 18 engages with the concavity 17 as shown in FIG. 2B and FIG. 2C. The longitudinal direction of the protrusions 21 approximately corresponds to a direction in which the first body 3 and the second body 13 are drawn out from a mold. Thus, if the protrusions 21 are formed in parallel with the engagement direction, separating molding dies can be performed easily.

Further preferably, the protrusions 21 are plural gathers 21A protruded as streaks which have each appropriate cross-sectional protruded height (about ⅓ of a gap between A-surface and B-surface) and have each appropriate cross-sectional width (approximately same as the cross-sectional protruded height). The gathers 21A can be wave-shaped, which has each appropriate height and appropriate gap shown in FIG. 2B, and can be rectangular-shaped, which has each appropriate height and appropriate gap shown in FIG. 2C.

Preferably, the protrusions 21 are formed in a same shape on all peripheral surfaces of the annular convexity 18 and all peripheral surfaces of the annular concavity 17 at same intervals, not to cause stress concentration.

Figure 3A:
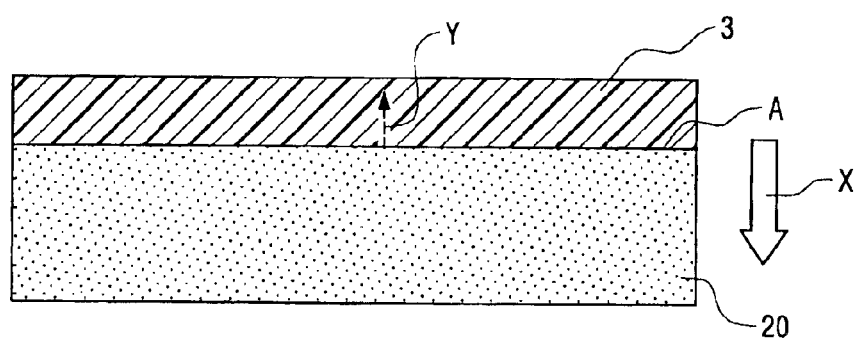
FIG. 3A is a cross-sectional view illustrating the bonding structure without protrusions.

In FIG. 3A, which illustrates a cross-section of the adhesion section 14, the protrusions are not formed on the A-surface. When a tensile stress works to tear the glue 20 off the A-surface in direction X (perpendicular to the A-surface), bonding force works in direction Y (perpendicular to the A-surface, counter direction of the tensile stress) between the glue 20 and the A-surface, and the bonding force resists the tensile stress.

Figure 3B:
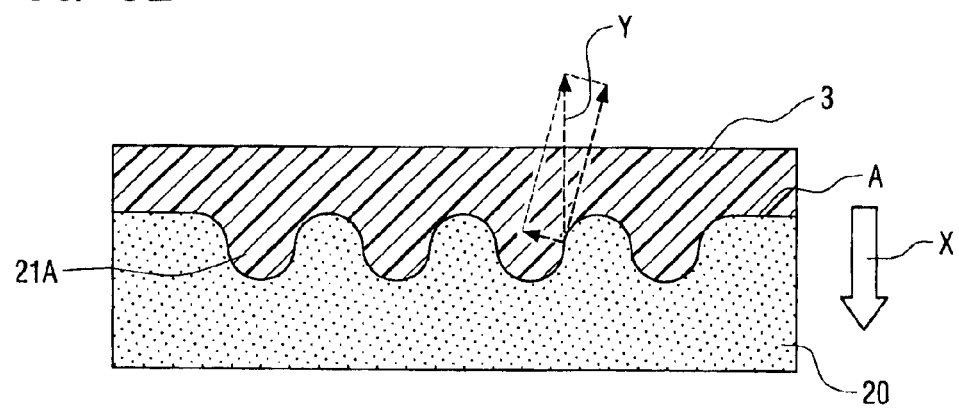
FIG. 3B is a cross-sectional view illustrating the bonding structure with wave-shaped protruded gathers.

However, when the A-surface has the protruded gathers 21A as shown in FIG. 3B, bonding area between the glue 20 and the A-surface is enlarged by additional surface of the protruded gathers 21A, and bonding strength is enhanced when a tensile stress works in the direction X to tear the glue 20 off the A-surface, the bonding force works at the gathers 21A against the tensile stress in the same manner as shown in FIG. 3A. Furthermore, in the shearing direction, which is perpendicular to the tensile direction (perpendicular to the A-surface in which tensile bonding force works), strong shearing bonding strength works. Thus, addition of the protrusions 21 enhances the bonding strength remarkably. In case of the rectangular-shaped gathers shown in FIG. 2C, bonding strength in shearing direction is larger than wave-shaped gathers shown in FIG. 2B and is preferable. (The rectangular-shaped gathers have minimum rounded edges to avoid stress concentration.)

Figure 4A:
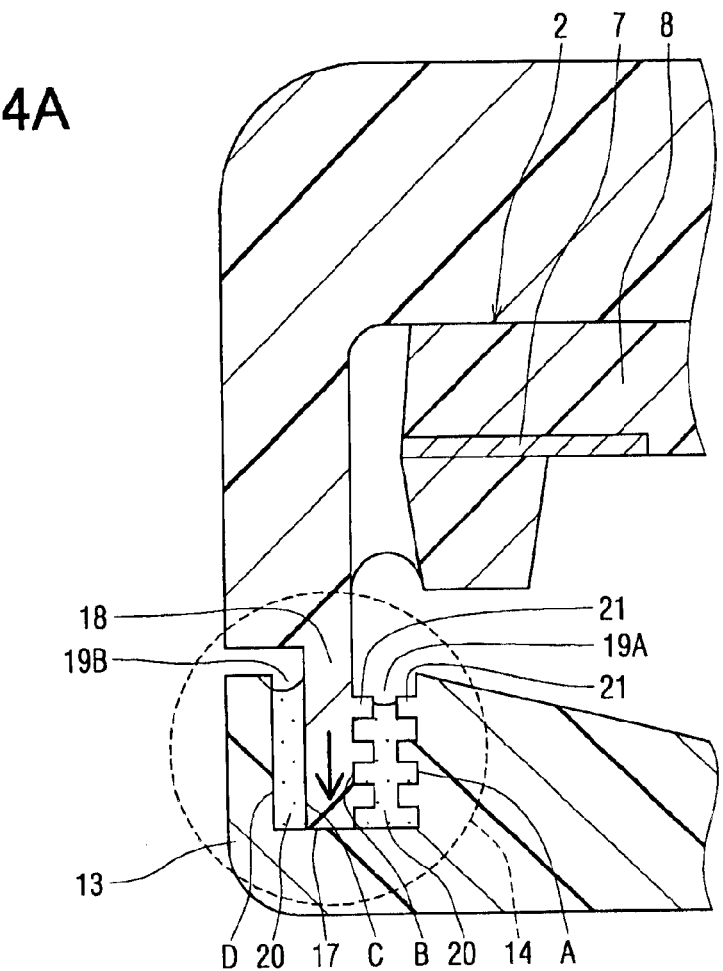
FIG. 4A is a cross-sectional view illustrating the protrusions formed perpendicularly to the engaging direction.
Figure 4B:
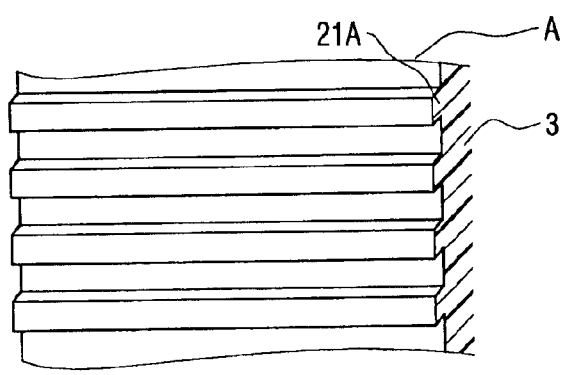
FIG. 4B is a schematic view illustrating the bonding structure with rectangular-shaped protruded gathers.
Figure 4C:
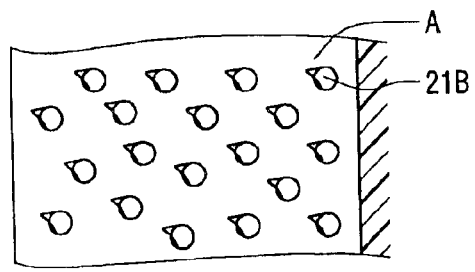
FIG. 4C is a schematic view illustrating another shape of raised portions.

The protrusions 21 are not limited to the shapes shown in FIG. 2A to FIG. 2C necessarily. As shown in FIG. 4A, and FIG. 4B, the protrusions can be formed approximately perpendicularly to the direction in which the convexity 18 engages with the concavity 17. Furthermore, the protrusions 21 can be plural raised portions 21B as shown in FIG. 4C. By the additional bonding area of the raised portions 21B, and by increase of the bonding strength in shearing direction, bonding strength with the glue 20 can be enhanced.

In this embodiment, the first body 3 shown in FIG. 2A is made of PPS or the like. PPS is a heat-resisting material so that the first body 3 can resist heat which arises while wire bonding work. The glue 20 is made of hard epoxy resin. The second body 13 is made of PBT. PBT is inferior to PPS in heat-resisting property. However, PBT costs lower than PPS. Each coefficient of linear expansion of resin materials are, PPS; about 28 ppm, hard epoxy resin; about 39 ppm, and PBT; about 52 ppm.

To research bonding of the inner-gap and the outer-gap, in which glue is filled, a cyclic thermal shock test was conducted under actual application temperature environment (−40° C. to 120° C.).

In the test, all of the peripheral bonding surfaces are formed to be flat, and protrusions 21 are not formed in the same manner as shown in FIG. 3A.

Here, as shown in FIG. 2A, the inner peripheral surface of the concavity 17 of the first body 3 is referred to as "A-surface", the outer peripheral surface of the concavity 17 as "D-surface", the inner peripheral surface of the convexity 18 of the second body 13 as "B-surface", and the outer peripheral surface of the convexity 18 as "C-surface". An annular gap between A-surface and B-surface is referred to as "inner-gap" 19A, and an annular gap between C-surface and D-surface as "outer-gap" 19B.

As a result of the thermal shock test, a peel arose between the D-surface, which is the outermost peripheral surface, and the glue 20. Subsequently, a peel arose at the B-surface and arose at A-surface, thus forming a leak path.

From the experiment, peeling is considered to be apt to arise at the outer-gap 19B, so the outer-gap 19B is preferable to be designated to relieve peeling stress. The protrusions 21 are not formed on the C-surface and the D-surface, in which the first peeling arose, of the outer-gap 19B. Additionally, the protrusions 21 are formed on the opposing A-surface and B-surface of the inner-gap 19A, the surfaces between the protrusions 21 of the inner-gap 19A and the glue 20 bond strongly. Thus, the first body 3 and the second body 13 are joined air-tightly. On the contrary, both of the C-surface and the D-surface in the outer-gap 19B do not have the protrusions 21, and are formed to be flat so that bonding strength of the outer-gap 19B to be set inferior to the bonding strength of the inner-gap 19A by not forming the protrusions 21. When stress arises at the adhesive section 14 of the inner-gap 19A due to rigid bonding, the stress can be relieved at the outer-gap 19B. If the protrusions 21 are formed on each of the A-surfaces, B-surfaces, C-surfaces and D-surfaces, and are bonded with glue 20, bonding strength itself is enhanced, and bonding section 14 is joined rigidly. However, when thermal-stress or the like works at the entire bonding section 14, the stress cannot be relaxed from anywhere. Thus, a peeling is apt to arise at either surface of the inner-gap 19A or the outer-gap 19B and a leak path can be formed.

Forming of the protrusions 21 in either the inner-gap 19A or the outer-gap 19B, and not forming of the protrusions 21 in the other gap is effective to enhance bonding strength between the first body 3 and the second body 13. So both peripheral surfaces inside of the outer-gap 19B have the protrusions 21 and both peripheral surfaces inside of the inner-gap 19A are flat, is also effective to enhance bonding strength. Furthermore, the protrusions 21 can be formed only on the C-surface or the D-surface of the outer-gap 19B. As far as the protrusions 21 are formed on no less than one surface of the A-surface, B-surface, C-surface and D-surface, bonding strength of the entire bonding section 14 is enhanced.

The protrusions 21 can be formed only partially on the peripheral surface, and can be formed partially in height direction (perpendicular to the periphery) of the peripheral surface, as far as the bonding structure keeps air-tight property.

When the protrusions 21 are not formed on the inner-gap 19A or the outer-gap 19B, the gap, on which the protrusions 21 are not formed, does not have to be filled with the glue 20 so that stress can be relaxed. The other gap has the protrusions 21 on its peripheral surfaces, and is filled with the glue 20, and bonded air-tightly.

The bonding structure is not limited to the embodiment described above, and can be varied and used for other purposes than a pressure sensor which has the concavity 17 and the convexity 18 such as the bonding section 14.

The bonding structure can be used when the material of the first body 3 and the material of the second body 13 has same coefficient of linear expansion.

The bonding structure can be used for an engagement of plural convexities 18 and plural concavities 17.

The convexity 18 and concavity 17 can be not only annular shaped, but also approximately rectangle, approximately semicircle, and in other shape, as far as the convexity 18 and the convexity 17 are formed at bonding section circumferentially.

The cross-sectional shape of the concavity 17 and the convexity 18 can be in a varied shape, such as oval, trapezoid, triangle, and so on, as far as the concavity 17 can engage with the convexity 18.

Forming of recesses at the peripheral surfaces of the concavity 17 and the convexity 18 is also effective to enlarge adhesive area with the glue 20.

Either the inner-gap 19A or the outer-gap 19B between the concavity 17 and the convexity 18 is not necessarily needed when the protrusions 21 are not formed on the peripheral surface. In this case, even if the convexity 18 fits into the concavity 17 contacting at each of the peripheral surfaces where the protrusions 21 are not formed, the peripheral surfaces are effective to relax stress, and the other gap, which has the protrusions 21 on its peripheral surfaces and filled with the glue 20, can be bonded air-tightly.

What is claimed is:

1. A bonding structure to bond a first body and a second body air-tightly, comprising:

a convexity which is formed circumferentially in one of the first body and the second body;

a concavity which is formed in another of the first body and the second body to engage with the convexity, wherein the convexity and the concavity form a gap between a peripheral surface of the convexity and a peripheral surface of the concavity; and adhesive material filled in the gap to bond the convexity and the concavity, wherein a peripheral surface of the gap has a protrusion protruding in a radial direction, and the first body has a pressure sensor element, and the second body has a pressure inlet that leads pressure to the sensor element.

2. A bonding structure according to claim 1, wherein the convexity partitions the concavity into the inner-gap, which is defined by an inner peripheral surface of the convexity and an opposing peripheral surface of the concavity, and the outer-gap, which is defined by an outer peripheral surface of the convexity, and an opposing peripheral surface of the concavity, and one of the inner-gap and the outer-gap has the protrusion on at least one peripheral surface of the concavity and the convexity.

3. A bonding structure according to claim 2, wherein only the inner peripheral surface of the convexity and the opposing peripheral surface of the concavity has the protrusion, respectively.

4. A bonding structure according to claim 2, wherein only the outer peripheral surface of the convexity and the opposing peripheral surface of the concavity have the protrusions, respectively.

5. A bonding structure according to claim 1, wherein the protrusion is formed to extend in a direction in which the first body engages with the second body.

6. A bonding structure according to claim 1, wherein the protrusion are formed to extend perpendicularly to a direction in which the first body engages with the second body.

7. A bonding structure according to claim 1, wherein the protrusion is formed on an entire peripheral surface of the convexity.

8. A bonding structure according to claim 1, wherein the protrusion is formed on an entire peripheral surface of the concavity.

9. A bonding structure according to claim 1, wherein the first body and the second body have different coefficients of linear expansion from each other.

* * * * *